(12) United States Patent
Day et al.

(10) Patent No.: US 8,595,932 B2
(45) Date of Patent: Dec. 3, 2013

(54) METHOD FOR MAKING A FIN AND DEVICE FOR IMPLEMENTING SAID METHOD

(75) Inventors: Alan Day, Reims (FR); Bernard Durieux, Tinqueux (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 481 days.

(21) Appl. No.: 12/919,302

(22) PCT Filed: Feb. 27, 2009

(86) PCT No.: PCT/EP2009/052404
§ 371 (c)(1),
(2), (4) Date: Nov. 15, 2010

(87) PCT Pub. No.: WO2009/106630
PCT Pub. Date: Sep. 3, 2009

(65) Prior Publication Data
US 2011/0041338 A1 Feb. 24, 2011

(30) Foreign Application Priority Data

Feb. 27, 2008 (FR) ........................................ 08 01051
Feb. 27, 2009 (EP) .................... PCT/EP2009/052404

(51) Int. Cl.
*B21D 53/02* (2006.01)
(52) U.S. Cl.
USPC .............................. 29/890.03; 72/197; 29/6.1
(58) Field of Classification Search
USPC .................. 29/6.1, 413, 890.03; 72/197, 379; 83/469
See application file for complete search history.

(56) References Cited

U.S. PATENT DOCUMENTS

| | | | | |
|---|---|---|---|---|
| 1,365,258 A | * | 1/1921 | Lundin | 72/186 |
| 1,450,351 A | * | 4/1923 | Beran | 72/196 |
| 2,071,584 A | * | 2/1937 | Shippy | 72/185 |
| 3,167,046 A | * | 1/1965 | Modine | 29/890.03 |
| 3,318,128 A | * | 5/1967 | Rhodes | 72/187 |
| 3,998,600 A | * | 12/1976 | Wallis | 428/595 |
| 4,067,219 A | * | 1/1978 | Bianchi | 72/186 |

(Continued)

FOREIGN PATENT DOCUMENTS

| JP | 58041636 A | 3/1983 |
|---|---|---|
| JP | 11-147149 A | 6/1999 |
| WO | WO 00-35690 A2 | 6/2000 |

OTHER PUBLICATIONS

English language abstract for JP 58041636 extracted from espacenet.com database, dated Jan. 10, 2011, 8 pages.

(Continued)

*Primary Examiner* — David Bryant
*Assistant Examiner* — Ruth G Hidalgo-Hernandez
(74) *Attorney, Agent, or Firm* — Howard & Howard Attorneys PLLC

(57) ABSTRACT

The invention relates to a method for manufacturing a fin (4) of width 1 and comprising corrugations (20) for a heat exchanger comprising at least one step of splitting a metal sheet (2) into at least two strips (4) of width 1 and a step of folding the strips (4) of width 1 in order to obtain the corrugations (20). The steps of splitting and of folding the metal sheet (2) take place simultaneously. A further subject of the invention is a device for applying such a method and a fin and a heat exchanger obtained by such a method, particularly for use in the motor-vehicle field.

12 Claims, 2 Drawing Sheets

(56) References Cited

U.S. PATENT DOCUMENTS

| | | | |
|---|---|---|---|
| 4,507,948 A * | 4/1985 | Wallis | 72/185 |
| 4,685,318 A * | 8/1987 | Ueda et al. | 72/185 |
| 4,748,838 A * | 6/1988 | Cornelison | 72/185 |
| 4,838,065 A * | 6/1989 | Wallis | 72/185 |
| 4,956,987 A * | 9/1990 | Hara et al. | 72/185 |
| 5,261,262 A * | 11/1993 | Wallis | 72/185 |
| 5,454,286 A * | 10/1995 | Takaha | 83/346 |
| 5,732,460 A * | 3/1998 | Paternoster et al. | 29/727 |
| 5,732,584 A * | 3/1998 | Prater et al. | 72/187 |
| 5,983,692 A * | 11/1999 | Bruck | 72/187 |
| 6,564,607 B2 * | 5/2003 | Nozaki et al. | 72/185 |
| 6,594,896 B2 * | 7/2003 | Morihira et al. | 29/890.03 |
| 7,866,042 B2 * | 1/2011 | Kolb | 29/890.03 |

OTHER PUBLICATIONS

English language translation and abstract for JP 11-147149 extracted from PAJ database, dated Jan. 14, 2011.

PCT International Search Report for PCT/EP2009/052404, dated Apr. 23, 2009, 4 pages.

* cited by examiner

METHOD FOR MAKING A FIN AND DEVICE FOR IMPLEMENTING SAID METHOD

RELATED APPLICATIONS

This application claims priority to and all the advantages of International Patent Application No. PCT/EP2009/052404, filed on Feb. 27, 2009, which claims priority to French Patent Application No. FR 08/01051, filed on Feb. 27, 2008.

The invention relates to a method for manufacturing a fin, a device for applying such a method and a fin and a heat exchanger obtained by such a method. It will find its applications notably in the field of heat exchangers for motor vehicles.

The function of a heat exchanger is to exchange heat between a first fluid circulating inside tubes of said heat exchanger and a second fluid such as, for example, atmospheric air. In order to increase the exchange of heat between these fluids, it is normal to furnish the heat exchangers with a plurality of fins interposed between two tubes of the heat exchanger and making it possible to increase the exchange surfaces and/or to disrupt the flow of the fluids.

The invention relates more particularly to a method for manufacturing a fin, which is of the corrugated type. These fins are also called "inserts" when they are situated outside the circulation tubes of the heat exchanger and "agitators" when they are situated inside the tubes. These corrugated fins may notably be used in the case of brazed heat exchangers.

Already known, notably in document JP 11-147149, is a method for manufacturing a fin of width l and comprising corrugations for a heat exchanger comprising a step of splitting a metal sheet into at least two strips of width l and a step of folding the strips of width l in order to obtain the corrugations. In this document, a first tool splits a metal sheet along its longitudinal axis; the resulting two metal strips then move into a second tool which forms corrugations in said metal strips.

However, the rate of production of corrugated strips by such a manufacturing method is not satisfactory. This causes a limitation in the rate of the machines for assembling the core of the heat exchanger, downstream.

The object of the present invention is to remedy this drawback.

For this purpose, it proposes a method for manufacturing a fin of the type defined above in which the steps of splitting and of folding said metal sheet take place simultaneously.

Therefore, the invention makes it possible to increase the capacity of the machines for manufacturing corrugated fins thus increasing the general rate of the process of assembling the core of a heat exchanger.

Further subjects of the present invention are a device allowing the application of the method and a fin and a heat exchanger obtained by such a method.

Figure 1:
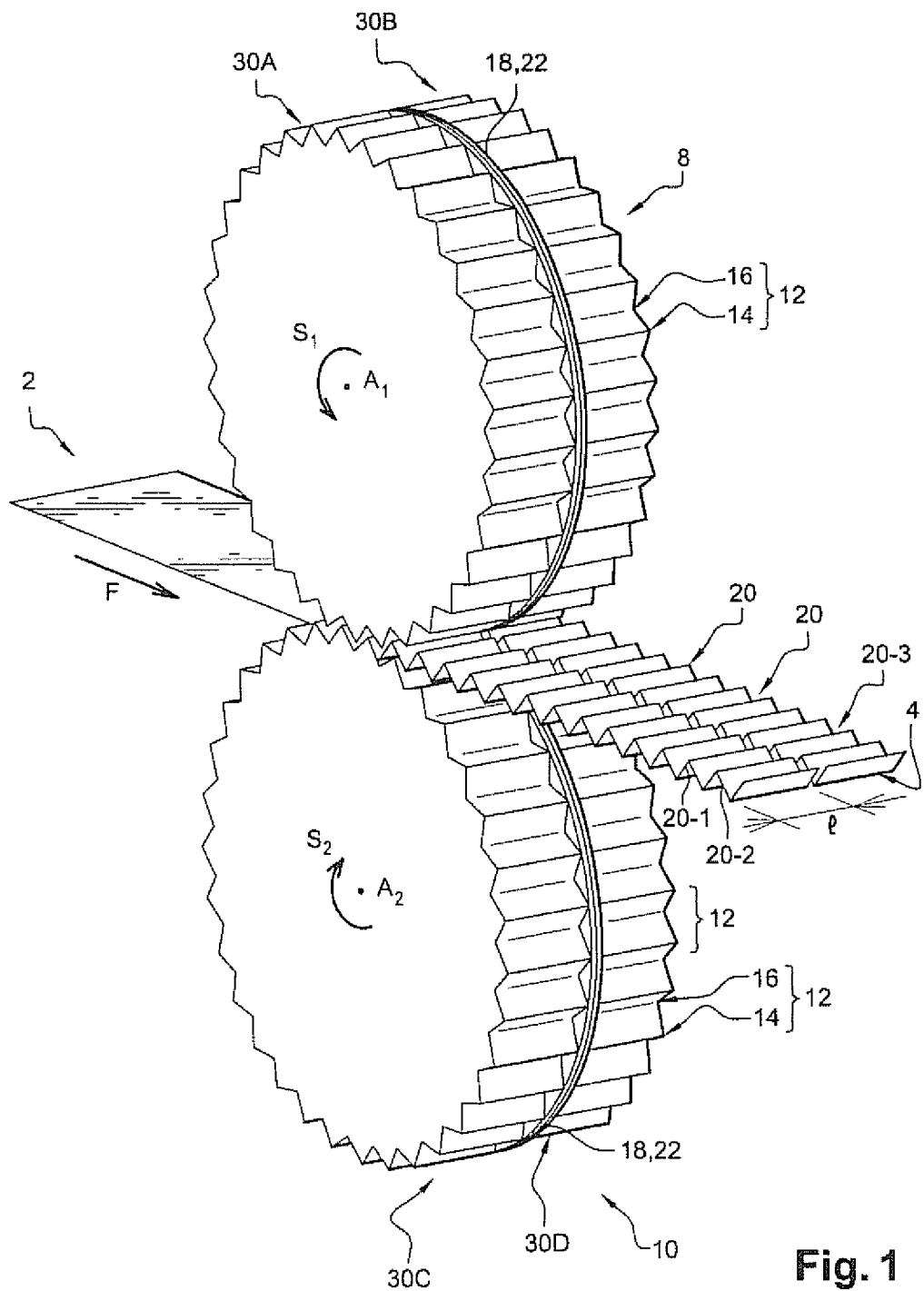
FIG. 1 represents an exemplary application of the method and the device according to the invention.

FIG. 1 represents a very long metal sheet 2; the metal sheet is preferably made of aluminum. During the manufacture of a fin 4 according to the method of the present invention, the metal sheet 2 is guided in the direction of the arrow F in order to form the fin 4.

For this a splitting and a folding of the metal sheet 2 is carried out. According to the invention, these two steps are simultaneous.

The method for manufacturing the fin 4 also comprises, for example, a step of forming transverse slots (not shown in FIG. 1) at a distance from one another in the flat zones of the corrugations of the strips of width l; the slots may notably be oriented parallel to the longitudinal axis of a fin 4. In this instance, the longitudinal axis of a fin 4 is intended to be an axis in a direction perpendicular to the width l of a fin 4 or else an axis parallel to the direction F as shown in FIG. 1. The step of forming the transverse slots takes place by cutting and lifting a portion of the fin. More particularly, the formation of the transverse slots is carried out on the flat zones connecting two adjacent corrugations and not over the whole of the fin 4.

These transverse slots form a flow deflector making it possible to improve the exchange of heat.

The step of forming the transverse slots may take place simultaneously with the steps of splitting and of folding the strips of width l.

The method for manufacturing the fin 4 may also comprise a step of cutting the fin 4 of width l to a predetermined length.

In order to apply the method described above, the device according to the invention consists of at least two forming wheels 8 and 10, each furnished with means 12 for deforming the metal sheet 2. The forming wheels 8 and 10 are formed by a stack of disks called deformation disks or forming disks 30 between which are inserted, at a determined height, one or more disks called splitting disks 22. For reasons of simplification of FIG. 1, the deformation disks are shown in the form of four blocks 30-A, 30-B, 30-C and 30-D.

Each deformation disk 30 comprises deformation means 12. The deformation means 12 are, in this instance, formed by teeth protruding radially, each tooth being formed by two ridges connected at a peak.

In other words, the deformation means 12 may also be seen as so many series of peaks 14 alternating with series of hollows 16, provided at the circumference of each disk.

The deformation disks 30 may also be furnished with means capable of forming the transverse slots defining a deflector as described above. The means or sharp edges are situated on one of the two ridges of a tooth. A sharp edge may be present at the end of certain teeth or each tooth of a deformation disk 30.

The relative positioning of the forming wheels 8 and 10 is carried out so that the teeth of the two forming wheels 8 and 10 mesh together as shown in FIG. 1.

The forming wheels 8 and 10 also comprise means 18 for splitting the metal sheet 2. In this instance, the splitting means 18 are made in the form of one or more blades carried, on specific disks called splitting disks 22, by each of the forming wheels 8 and 10. In FIG. 1, two splitting disks 22 are shown on each forming wheel.

These splitting disks 22 make it possible to split the metal sheet 2 into at least two strips of width l. It will be noted that the splitting of the metal sheet 2 into two strips of width l makes it possible to cut the metal sheet 2 in the direction of its length or else in other words in the direction of the arrow F shown in FIG. 1; this operation is carried out over the whole of the fin 4. For this, the splitting disks 22 are placed on each forming wheel at a height equal to the width l of the fin 4.

The splitting disks 22 have a profile similar to the deformation disks 30 of the forming wheels 8 and 10.

Figure 2:
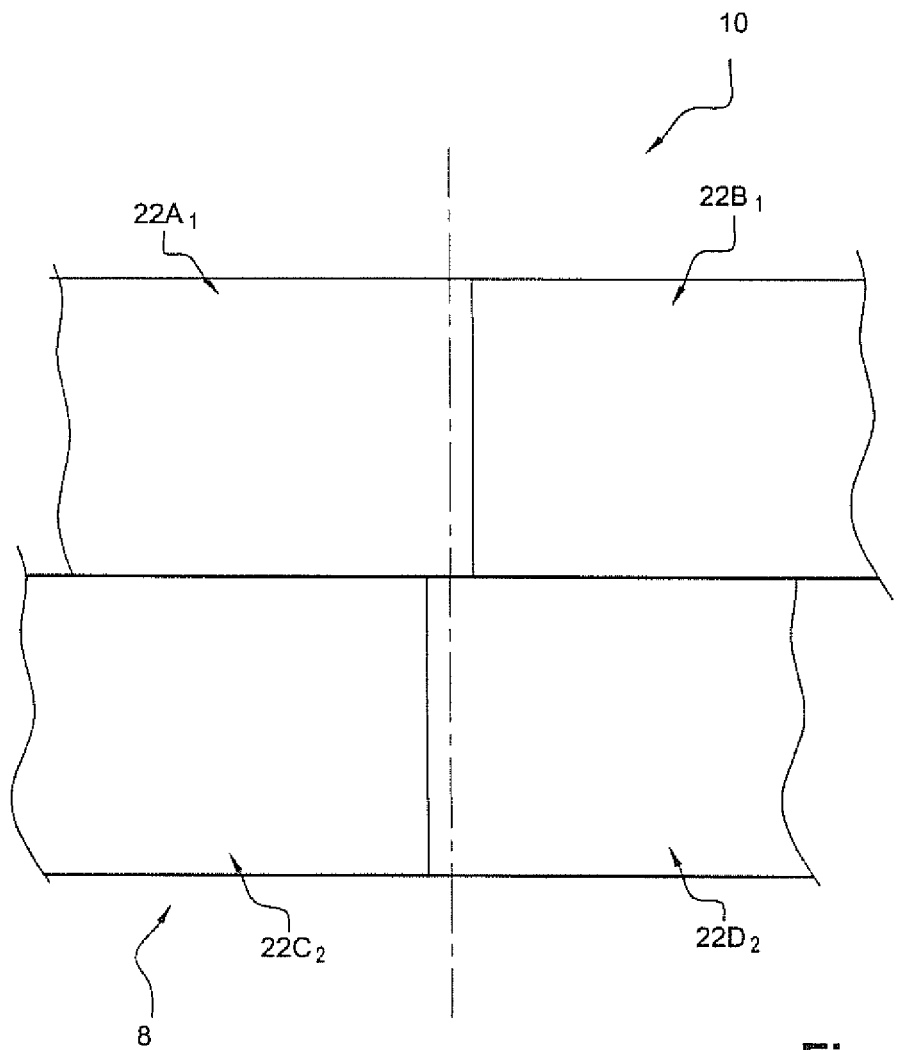
FIG. 2 represents schematically a detail of the device according to the invention, this detail being situated at the disks called splitting disks of the wheels of the device according to the invention.

The splitting disks 22 belonging to one and the same forming wheel have different diameters. In the embodiment shown in FIG. 2, the diameters of the splitting disks 22A1 and 22D2 (belonging respectively to the forming wheels 8 and 10) have a diameter that is larger than that of the splitting disks 22B1 and 22C1 (belonging respectively to the forming wheels 8 and 10). For ease of understanding, only the splitting disks 22 of the forming wheels 8 and 10 have been shown in FIG. 2.

During the application of the method, the splitting disk 22A1 of the forming wheel 8 comes into contact with the splitting disk 22B1 of the forming wheel 10. In the same manner, during the application of the method, the splitting disk 22C2 of the forming wheel 8 comes into contact with the splitting disk 22D2 of the forming wheel 10.

The splitting disks 22 comprise, on their circumference, means designed to shear the metal sheet 2 into two strips 4 of width l. Therefore, the splitting is carried out without removal of material and therefore without fall of material. In FIG. 1, the splitting disks 22 have been simplified and accentuated in their dimension in order to make comprehension easier.

During the manufacture of the fin 4 according to the method of the present invention and as shown in FIG. 1, the forming wheels 8 and 10 of the device rotate in opposite directions about their respective axis of rotation $A_1$ and $A_2$ in the direction $S_1$ for the forming wheel 8 and in the direction $S_2$ for the forming wheel 10.

During the manufacture of the fins 4, the peaks 14 of the deformation means 12 of one forming wheel fit into the hollow 16 of the deformation means 12 of the second forming wheel. This allows the formation of corrugations 20 consisting of flat zones 20-1 and 20-2 and folded zones 20-3 forming an elbow.

At the same time as the formation of these corrugations 20, the splitting means 18 split or shear the metal sheet 2 along its longitudinal axis into two strips of width l in order to obtain said two strips of width l.

In this embodiment, the metal sheet is simultaneously:
folded with the aid of the alternation of peaks 14 and hollow 16,
split with the aid of splitting means 18 provided on the splitting disks 22, and
transverse slots forming flow deflectors are formed with the aid of sharp edges.

Therefore, the two fins 4 are formed and separated simultaneously by the forming wheels 8 and 10.

The invention is not limited to the embodiments described above, only as examples, but it covers all the variants that those skilled in the art can envisage in the context of the following claims.

The invention claimed is:

1. A method for manufacturing a fin (4), for a heat exchanger, said fin (4) having a width l and comprising corrugations (20), said method comprising at least one step of splitting a metal sheet (2) into at least two strips of width l and a step of folding the strips of width l in order to obtain the corrugations (20), characterized in that said steps of splitting and of folding said metal sheet (2) take place simultaneously using a device comprising at least two wheels (8; 10) each wheel having a means (12) for deforming the metal sheet (2) and a means (18) for splitting the metal sheet (2).

2. The manufacturing method as claimed claim 1 further comprising a step of forming transverse slots at a distance from one another in the strips of width l.

3. The method as claimed in claim 2, wherein said step of forming the transverse slots takes place simultaneously with said steps of splitting and of folding the strips of width l.

4. The method as claimed in claim 3, further comprising a step of cutting the fin (4) of width l to a predetermined length.

5. A device for manufacturing a fin (4), the fin (4) having a width l and comprising corrugations (20), said device comprising at least two wheels (8; 10) each furnished with means (12) for deforming a metal sheet (2) and with means (18) for splitting the metal sheet (2) into at least two strips of width l to obtain the corrugations (20) of the fin (4).

6. The device as claimed in claim 5, wherein said deformation means (12) of said first wheel (8) fit into said deformation means (12) of said second wheel (10).

7. The device as claimed in claim 5, wherein said splitting means (18) are blades carried by disks of each of said wheels (8; 10).

8. The device as claimed in claim 6, wherein said splitting means (18) are blades carried by disks of each of said wheels (8; 10).

9. A device for manufacturing a fin (4), the fin (4) having a width l and comprising corrugations (20), said device comprising at least two wheels (8; 10) each furnished with means (12) for deforming a metal sheet (2) and with means (18) for splitting said metal sheet (2) into at least two strips of width l to obtain the corrugations (20) of the fin (4), wherein said metal sheet (2) is in contact with said means (18) and is split to obtain said two strips of width l.

10. The device as claimed in claim 9, wherein said deformation means (12) of said first wheel (8) fit into said deformation means (12) of said second wheel (10).

11. The device as claimed in claim 9, wherein said splitting means (18) are blades carried by disks of each of said wheels (8; 10).

12. The device as claimed in claim 10, wherein said splitting means (18) are blades carried by disks of each of said wheels (8; 10).

* * * * *